United States Patent
York et al.

(10) Patent No.: US 7,865,504 B2
(45) Date of Patent: Jan. 4, 2011

(54) NATIVE FILE TO SHARED RESOURCE LOCATOR NAMING

(75) Inventors: Justin E. York, Cypress, TX (US); Tony Isaac, Spring, TX (US)

(73) Assignee: SimDesk Technologies, Inc., Houston, TX (US)

( * ) Notice: Subject to any disclaimer, the term of this patent is extended or adjusted under 35 U.S.C. 154(b) by 571 days.

(21) Appl. No.: 11/774,963

(22) Filed: Jul. 9, 2007

(65) Prior Publication Data

US 2008/0016083 A1    Jan. 17, 2008

Related U.S. Application Data

(60) Provisional application No. 60/806,881, filed on Jul. 10, 2006.

(51) Int. Cl.
*G06F 7/76* (2006.01)
(52) U.S. Cl. ..................................... 707/716
(58) Field of Classification Search .............. 707/1, 707/10, E17.001, E17.01, 100, 999.001, 999.01, 707/999.1, 716
See application file for complete search history.

(56) References Cited

U.S. PATENT DOCUMENTS 6,519,626 B1 *   2/2003   Soderberg et al. ............ 709/203
2006/0235984 A1 * 10/2006   Kraus et al. .................. 709/228

* cited by examiner

*Primary Examiner*—James Trujillo
*Assistant Examiner*—Bruce M Moser
(74) *Attorney, Agent, or Firm*—Wong, Cabello, Lutsch, Rutherford & Brucculeri LLP

(57) ABSTRACT

File and folder names are converted between their native format and a shared resource locator format. To send information on a file or folder, the file or folder name is parsed into various components and those components are converted to components in the shared resource locator. Sufficient information is provided in the shared resource locator to allow receiving software to develop the proper full native file or folder name, irrelevant of the receiving system, be it having different native formats, different drive letters and the like. A user need only click on a file or folder and a shared resource locator string is provided for pasting into emails or documents. Clicking on a shared resource locator results in the operating system automatically opening the file or folder from its shared location without manual conversions and the like.

19 Claims, 4 Drawing Sheets

NATIVE FILE TO SHARED RESOURCE LOCATOR NAMING

CROSS REFERENCE TO RELATED APPLICATIONS

This application claims the benefit under 35 U.S.C. §119 (e) of U.S. Provisional Patent Application Ser. No. 60/806,881, entitled "Native File to Shared Resource Locator Naming" by Justin York and Tony Isaac, filed Jul. 10, 2006, which is hereby incorporated by reference.

BACKGROUND OF THE INVENTION

1. Field of the Invention

The invention relates to file naming formats, and more specifically to conversions between native file formats and resource locators.

2. Description of the Related Art

Computer networks have greatly improved business communications and operations. Email has become an indispensable tool to pass both information and files. Shared network storage of files has also allowed simplified group use of particular files, such as text documents and the like. However, in a shared setting it is very difficult for one person to actually reference a particular file for use by another person. A first difficulty is that the file or folder is specified in a native file format on the originator's computer, such as K:\\Shared\example.doc in a Windows system. The receiving party may have access to the file, as it is on a shared network volume, but may have it defined as the R: drive. Thus simply copying the full path will not work. In some systems, such as those using software from Simdesk, shared folders are designated as Folders Shared To Me and Folders Shared To Others, and these names are in the full pathname of the file. Therefore it is even more difficult to provide a reference as not just drive letters may be different but also at least one folder level as well. Foreign language issues provide further complications. When sharing between computers having different native file formats, such as those used with Linux or Apple operating systems, the complexities even further multiply.

One common way to solve these problems is for users to email documents to each other, but then version problems develop and significant disk space may be used by the multiple copies. Another way to address the issue is to strictly enforce drive and folder naming conventions, but that cannot address many issues, such as different native formats, foreign languages and mirrored folder names as in the Simdesk system. It is desirable to have some technique to simplify these problems and allow users to simply paste information into emails or files to allow any recipient having access to the shared file to be able to access the file by just clicking on the information.

SUMMARY OF THE PRESENT INVENTION

In embodiments according to the present invention, file and folder names are converted between their native format and a shared resource locator format. To send information on a file or folder, the file or folder name is parsed into various components and those components are converted to components in the shared resource locator syntax. Sufficient information is provided in the shared resource locator to allow receiving software to develop the proper full native file or folder name, irrelevant of the receiving system, be it having different native formats, different drive letters and the like. A user need only click on a file or folder and a shared resource locator string is provided for pasting into emails or documents. Clicking on a shared resource locator results in the operating system automatically opening the file or folder from its shared location without manual conversions and the like.

DETAILED DESCRIPTION OF THE PREFERRED EMBODIMENT

Figure 1:
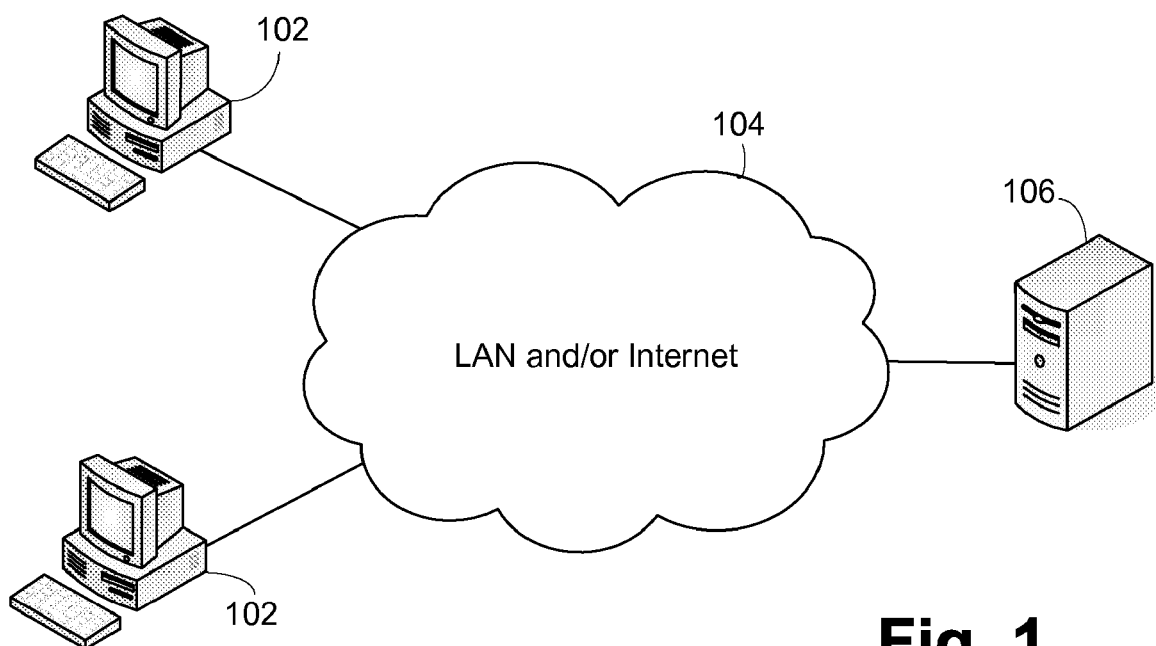
FIG. 1 is a block diagram of a computer network according to the present invention.

Referring now to FIG. 1, a series of workstations or computers 102 are connected through a network 104 such as a LAN and/or the Internet to a file server 106. The workstations 102 can be running any desired operating system, such as Windows, Linux, Apple, VMS and the like. The file server 106 can also be running any desired operating system, such as Windows, Linux, Apple or VMS and presenting files and folders according to various formats, such as SMB or CIFS, both well known to those skilled in the art. As is well known, the operating systems and program files are stored on computer readable media. Alternatively, and as done in the examples in this description, the file server 106 is a Simdesk system and is accessed over the Internet using Simdesk software executing on the workstation 102 under its native operating system. Briefly, the Simdesk system uses a secure connection through the Internet for file transfer, with the files being stored in a proprietary format, with the client software on the workstation 102 and the software on the file server 106 interacting to provide a system that makes the files and folders residing on the file server 106 appear locally on the workstation 102.

Figure 2:
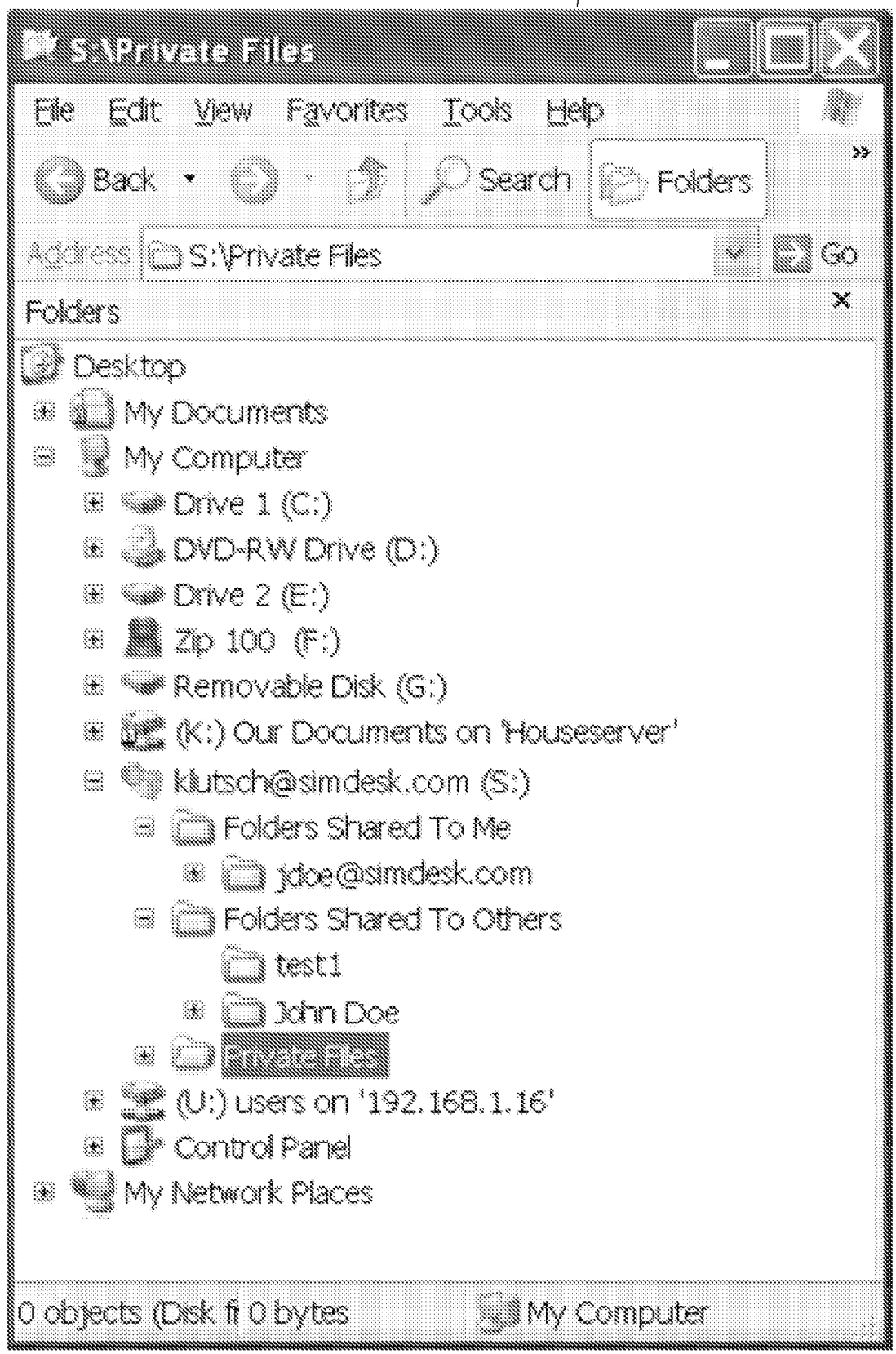
FIG. 2 is a screen shot of a folder structure according to the present invention.

FIG. 2 is a screen shot 200 illustrating folder names for a Windows operating system workstation with Simdesk software installed to provide a shared drive referred to as the S-drive in this description, not to be confused with the S: drive, though in most cases the Simdesk S-drive is assigned the drive letter S:. The S-drive is provided by Simdesk software which hooks into Windows to provide integrated connectivity to files and folders on the remote Simdesk file server. In the illustrated screen shot 200, various drive letters are provided under the My Computer icon. These include Drive 1 for the C: drive, Drive 2 for the E: drive, a K: drive which is a shared folder named Our Documents located on Houseserver, a U: drive which is mapped to a shared folder named users on a server at IP address 192.168.1.16, and the S-drive mapped at S: and labeled as klutsch@simdesk.com. Under the S: drive are three folders, Folders Shared To Me, Folders Shared To Others and Private Files. As discussed above, in the Simdesk environment, a user may share folders to other users and have other users share folders to him. Those shared to him are indicated under the Folders Shared To Me, in the illustrated case a folder named jdoe@simdesk.com for a folder from that user. If there were additional folders shared to the current user, they would appear in a similar fashion, that is, by the other user name. Similarly, under Folders Shared To Others, various folders such as test 1 and John Doe, a folder shared to jdoe@simdesk.com are shown. The folders under Folders Shared To Others can be named by the current user, as those are his folders. The folders directly under the folder Folders Shared To Me cannot be renamed, as they are automatically given this name by the system, with any folders under the user id folder named by the owner user or a user having proper access authority. The final folder is Private Files and is for files and folders only accessible to the current user, in the illustrated case klutsch@simdesk.com. In the Simdesk environment these special folders are presented in the native language of the current user, in the illustrated case English.

Therefore a full native path in Windows for a file from the illustrated example might be S:\\Folders Shared To Me\jdoe@simdesk.com\Demo\Patent.doc. To John Doe that same file might appear as T:\\Folders Shared To Others\Demo\Patent.doc if in a Windows environment or /home/jdoe/S-Drive/Folders Shared To Others/Demo/Patent.doc if in a Linux environment. Thus the difficulties of simply providing a file name to another user are well illustrated above. In the simpler Windows case the drive letters are different, the file is a different number of folders from the root and various folder names in the path are different.

Embodiments according to the present invention utilize a shared resource locator (SRL) to provide file and folder reference between users. When sending a file or folder name, it is converted into the SRL and when the SRL is received, it is converted to the proper full native path name. Thus the use of the SRLs remove system dependencies for file locations, allowing much easier transmission of file and folder names between users, avoiding the email problem described above and not requiring strict folder and drive letter naming conventions which must be manually enforced.

The basic syntax for an SRL is:

scheme//{{resource type:}resource owner}/path where braces indicates optional values.

A partial example is:

simdesk://s-drive:resourceowner@ownerdomain.com/path with the scheme being simdesk: and the resource type being s-drive.

Attached Table 1 provides more and more detailed examples, using both Windows and Linux variations. For Table 1 assume that the current user is klutsch@simdesk.com. A resource type is not used as only one resource type is supported for the particular file server and thus the proper resource type is inferred by the file server.

Figure 3:
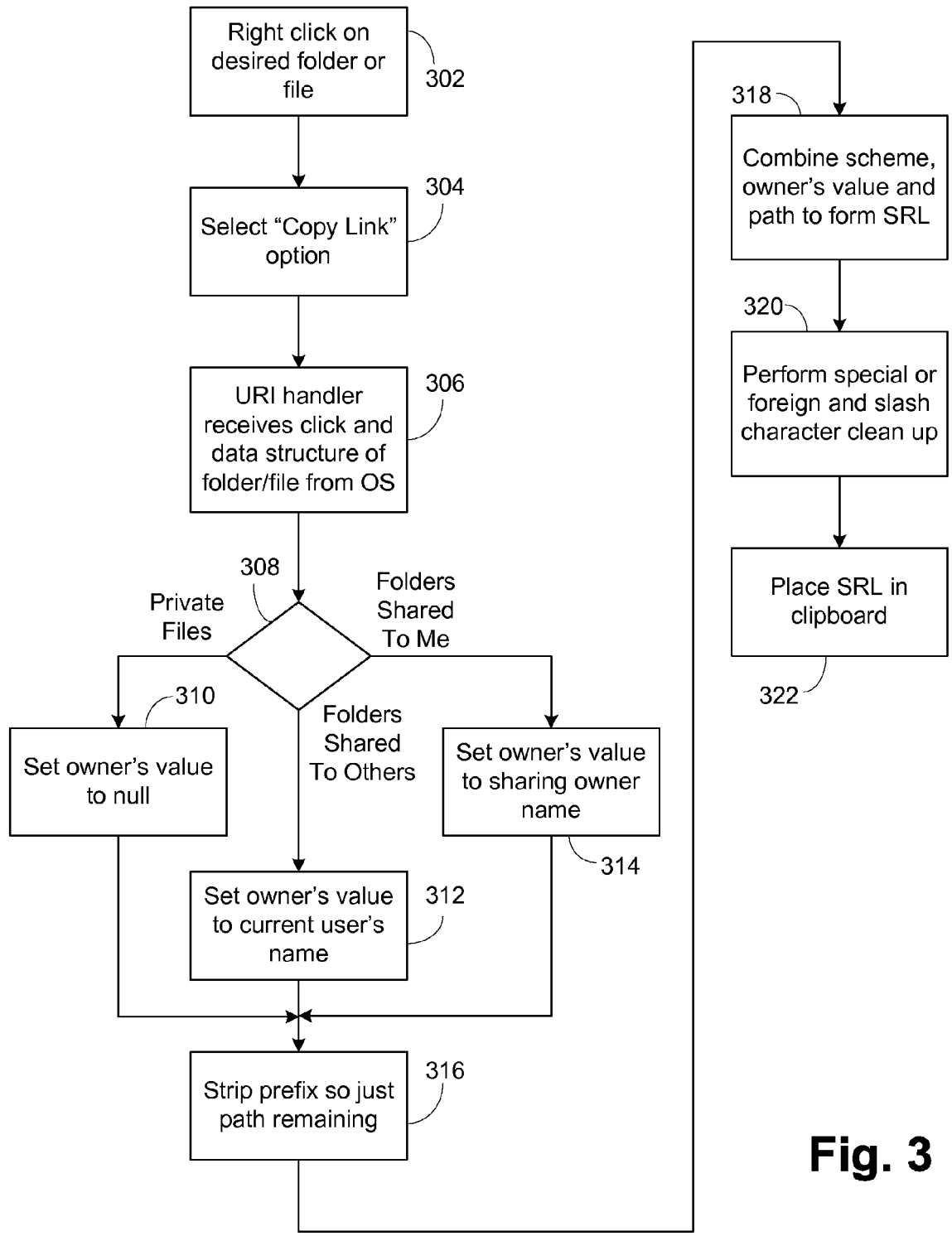
FIG. 3 is a flowchart for an embodiment of performing conversion from native format according to the present invention.

Referring now to FIG. 3, a flowchart to encode or translate a native full path name from Windows to an SRL is provided. At step 302 the user right clicks on the desired folder or file. In normal Windows operation this results in a pop up menu of various options or actions to perform on the selected file or folder. In the preferred embodiment when the software to handle the conversions is installed, the software registers an option Copy Link with Windows. When Windows develops the right click menu, it scans its registry to determine if other programs have registered to add options to the menu. As the software of the preferred embodiment has registered, Windows communicates with the software and the Copy Link option is presented. Those skilled in the art will understand the details of this registration and menu option addition operation in Windows and other operating systems. In step 304 the user selects the Copy Link option. In step 306 the SRL handler, the component that has registered with Windows, receives the click and a data structure that is the full native file or folder path name from Windows. In step 308 the SRL handler parses the data structure to determine if the strings Folders Shared To Others or Folders Shared To Me are present in the native language of the current user. If not, the file or folder is private, so in step 310 an owner's value is set to null. If the Folders Shared To Others string is present, then in step 312 the owner's value is set to the current user's name, such as klutsch@simdesk.com, as the folder is owned by the current user. In step 314 if the string Folders Shared To Me is present, the owner's value is set to the sharing owner's name, such as jdoe@simdesk.com. After any of steps 310, 312, or 314, in step 316 all values in the full pathname are removed up to the path for the file or folder. For example, the drive letter and Folders Shared To Me are removed. In step 318 the scheme, such as simdesk:, followed by two forward slashes, followed by the owner's value and a trailing forward slash are combined and set as a prefix to the path value provided from step 316. In step 320 special or foreign characters in the resulting string of step 318 are addressed. Because many computers do not necessarily operate using identical character sets, the SRL value must be converted to a lowest common denominator. Percent-encoding is preferably used for representation of special 8-bit characters such as "&" or "#" or other special characters that cannot be represented in a URL or SRL. For example, the HEX value for an ASCII space is 0x20 so that a space character can be represented as % 20. Foreign characters must be treated differently as many computers cannot handle multi-byte codes used for foreign characters in the Unicode character set. The preferred embodiment converts the characters to a defined agnostic set of values, such as UTF-8, but other approaches can be used. Also in step 320 slash character conversion is performed, as Windows uses back slashes, Linux and Apple use forward slashes and VMS uses periods. After the cleanup is completed in step 320 and the SRL value is finished, the finished SRL value is placed in the clipboard for the user to paste as desired, such as into an email or a document, as a link value.

Figure 4:
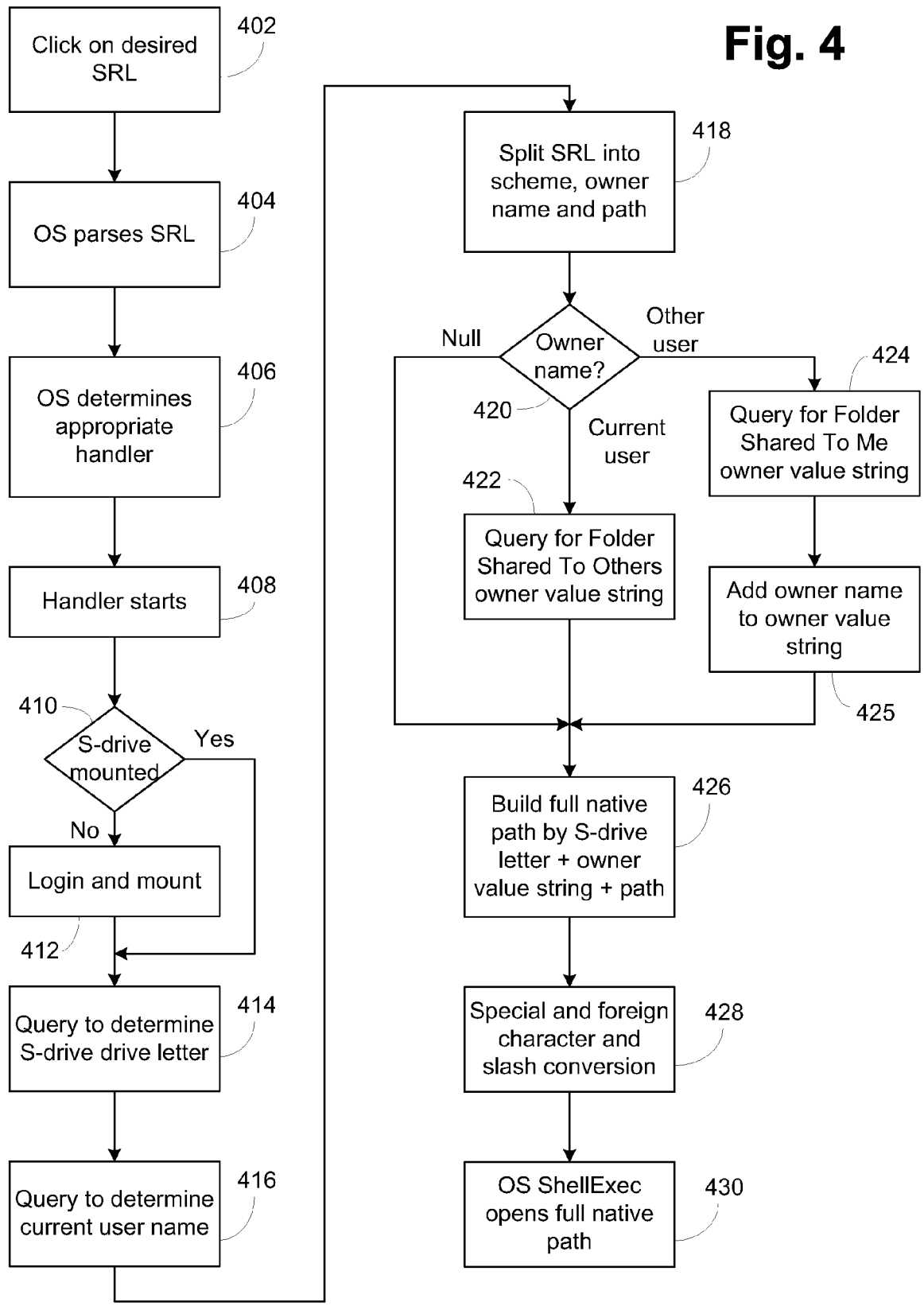
FIG. 4 is a flowchart for an embodiment of performing conversion to native format according to the present invention.

Software is provided to translate an SRL to the native file format of the receiving party. That operation is shown in FIG. 4. In step 402 the user clicks on the desired SRL. In step 404 the operating system, in this example Windows, parses the SRL. Windows parses the SRL until it detects the colon and then checks for registered handlers in step 406. In the exemplary cases the scheme is simdesk and is before the colon, so Windows will transfer the request to the simdesk handler. In step 408 the handler starts and receives the SRL string. In step 410 the handler checks if the S-drive is mounted. If not, the user is prompted to login to the Simdesk system and the S-drive is mounted in step 412. After step 412 or if the S-drive was mounted in step 410, in step 414 the handler queries the Simdesk software providing the S-drive capability for the drive letter assigned to the S-drive. It is understood to be more appropriate to use the term mount point for Linux and Apple systems, but as the flowchart is based on a Windows example, Windows terminology such as drive letter is used in this description. In step 416 the handler queries the Simdesk software to determine the current user name. In step 418 the handler parses the SRL into scheme, owner name and path. In step 420 a check is made of the owner name. If the current user matches the owner name, in step 422 the handler queries the Simdesk software to determine the proper string for Folders Shared To Others, to cover foreign language cases. If the owner name is not null and the current user does not match, in step 424 a query is made to determine the Folders Shared To Me string value. In step 425 the owner name is added to the owner value string containing Folders Shared To Me to provide the additional folder layer needed in the Simdesk system. If the owner name is null or after steps 422 and 425, in step 426 a full native path name is initially assembled. The drive letter or name is concatenated with the owner value string determined in steps 422 or 425, with the pathname being provided after that. This string is then reviewed in step 428 to convert the special character and foreign character values as appropriate for the operating system. Additionally in step 428 slash conversion is performed. With the full native path completed, in step 430 the operating system ShellExec opens the file or folder at the provided full native path.

Thus embodiments according to the present invention utilize handlers linked into the operating system of the workstation to automatically perform translations or conversions between the native file format and a shared resource locator (SRL). The user need only select to copy the link and the SRL is automatically placed in the clipboard for easy copying. The user need only click on an SRL and the proper file or folder is automatically opened. No conversion steps or rigid uniform naming conventions need be performed by the user.

While a function Copy Link has been described, other variations to obtain and provide the SRL can be used. For example, a function Email Link could be used, which instead of pasting the SRL into the clipboard, opens the default email program and places the SRL in the email message area. While detailed flowcharts have been provided for Windows, it is understood that any workstation operating system may be used, with a similar flow of operations.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

combining said transferable value and said common component to develop a shared resource locator in a shared resource locator format which can be provided to the second user,
wherein the step of determining a transferable value includes:
 determining a scheme value;
 determining if the first user individual component includes folder owner information;
 if folder owner information is present, determining an owner value for inclusion in said shared resource locator; and
 combining said scheme value and said owner value to form said transferable value.

2. The method of claim 1, wherein said step of combining includes:
 performing special character conversions between the first user format and shared resource locator format.

3. The method of claim 2, wherein said special character conversions include conversions between forward and backward slashes.

4. The method of claim 2, wherein said special character conversions include percent encoding special characters present in the first user pathname which cannot be represented in said shared resource locator.

5. A method for providing a pathname for a jointly accessible file location from a first user, where the pathname is in a first user format and includes a component individual to the first user and a component common to all users, to a second user, where the pathname is in a second user format and includes a component individual to the second user and a component common to all users, the method comprising the steps of:

TABLE 1

| Windows Path | Linux Path | SRL |
|---|---|---|
| S:\ | /home/klutsch/S-Drive | simdesk:/// |
| S:\Image1.jpg | /home/klutsch/S-Drive/Image1.jpg | simdesk:///Image1.jpg |
| S:\Folder1 | /home/klutsch/S-Drive/Folder1 | simdesk:///Folder1/ |
| S:\Folder1\Image2.jpg | /home/klutsch/S-Drive/Folder1/Image2.jpg | simdesk:///Folder1/Image2.jpg |
| S:\Folders Shared To Others\Folder2\ | /home/klutsch/S-Drive/Folders Shared To Others/Folder2 | simdesk://klutsch@simdesk.com/Folder2/ |
| S:\Folders Shared To Others\Folder2\SomeDoc.doc | /home/klutsch/S-Drive/Folders Shared To Others/Folder2/SomeDoc.doc | simdesk://klutsch@simdesk.com/Folder2/SomeDoc.doc |
| S:\Folders Shared To Me\jdoe@simdesk.com\Releases\ | /home/klutsch/S-Drive/Folders Shared To Me/jdoe@simdesk.com/Releases/ | simdesk://jdoe@simdesk.com/Releases/ |
| S:\Folders Shared To Me\jdoe@simdesk.com\Releases\3.3Overview.rtf | /home/klutsch/S-Drive/Folders Shared To Me/jdoe@simdesk.com/Releases/3.3Overview.rtf | simdesk://jdoe@simdesk.com/Releases/3.3Overview.rtf |

What is claimed is:

1. A method for providing a pathname for a jointly accessible file location from a first user, where the pathname is in a first user format and includes a component individual to the first user and a component common to all users, to a second user, where the pathname is in a second user format and includes a component individual to the second user and a component common to all users, the method comprising the steps of:
 receiving the pathname of the first user;
 determining a transferable value for the first user individual component of the first user pathname;
 determining the common component of the first user pathname; and receiving the pathname of the first user;
determining a transferable value for the first user individual component of the first user pathname;
determining the common component of the first user pathname;
combining said transferable value and said common component to develop a shared resource locator in a shared resource locator format which can be provided to the second user;
providing said shared resource locator to the second user;
receiving said shared resource locator from the first user;
determining said transferable value and common component of said shared resource locator;
determining a second user individual component from said transferable value;

combining said second user individual value component and said common component to develop the second user pathname; and providing the second user pathname for use by the second user.

6. The method of claim 5, wherein said step of combining to develop the second user pathname includes:

performing special character conversions between the shared resource locator format and the second user format.

7. The method of claim 6, wherein said special character conversions include conversions between forward and backward slashes.

8. The method of claim 6, wherein said special character conversions include converting percent encoded special characters to special characters usable in the second user pathname.

9. The method of claim 5, wherein the step of determining a second user individual component includes:

determining a scheme value;

determining a local drive value based on said scheme value;

determining if said transferable value includes an owner value;

if an owner value is present, determining folder owner information for inclusion in the second user pathname; and combining said local drive value and said folder owner information to form said second user individual component.

10. The method of claim 9, wherein said local drive value is a drive letter.

11. The method of claim 9, wherein said local drive value is a mount point.

12. A method for providing a pathname for a jointly accessible file location from a first user, where the pathname is in a first user format and includes a component individual to the first user and a component common to all users, to a second user, where the pathname is in a second user format and includes a component individual to the second user and a component common to all users, the method comprising the steps of:

receiving a shared resource locator from the first user, said shared resource locator having a shared resource locator format and including a transferable value and a common component;

determining said transferable value and common component of said shared resource locator;

determining a second user individual component from said transferable value;

combining said second user individual value component and said common component to develop the second user pathname; and providing the second user pathname for use by the second user.

13. The method of claim 12, wherein said step of combining to develop the second user pathname includes:

performing special character conversions between the shared resource locator format and the second user format.

14. The method of claim 13, wherein said special character conversions include conversions between forward and backward slashes.

15. The method of claim 13, wherein said special character conversions include converting percent encoded special characters to special characters usable in the second user pathname.

16. The method of claim 12, wherein the step of determining a second user individual component includes:

determining a scheme value;

determining a local drive value based on said scheme value;

determining if said transferable value includes an owner value;

if an owner value is present, determining folder owner information for inclusion in the second user pathname; and combining said local drive value and said folder owner information to form said second user individual component.

17. The method of claim 16, wherein said local drive value is a drive letter.

18. The method of claim 16, wherein said local drive value is a mount point.

19. A computer-readable storage medium or media storing computer-executable instructions for performing the method recited in any one of claims 1, 2-4 and 5-18.

* * * * *